July 19, 1960  G. LUGLI  2,945,525
IMPROVED CINCTURE STRUCTURE
Filed Dec. 27, 1955

INVENTOR
Giuseppe Lugli
BY Stevens, Davis, Miller & Mosher
ATTORNEYS

United States Patent Office 2,945,525
Patented July 19, 1960

2,945,525

IMPROVED CINCTURE STRUCTURE

Giuseppe Lugli, Milan, Italy, assignor to Pirelli S.p.A., Milan, Italy

Filed Dec. 27, 1955, Ser. No. 555,713

Claims priority, application Italy Jan. 15, 1955

12 Claims. (Cl. 152—361)

This invention relates to a novel cincture structure for a pneumatic tire.

The construction of pneumatic tires for vehicle wheels of any kind, characterized by a cincture structure, namely, a ring-shaped structure constituted of strips extending along the whole peripherical development of the tire in the zone below the tread, is well known to those skilled in the art.

Also known are tires wherein the cincture structure is of the kind particularly suitable to withstand tension stresses and is put under tension by means of the inflation pressure.

These cincture structures may be made of one or more layers of cords disposed in a prevailingly longitudinal direction, that is with the cords practically lying in parallel planes with respect to the symmetry plane normal to the axis of rotation of the tire, or of an even number of crossed layers forming with the longitudinal plane of symmetry preferably small angles.

The present invention relates to some practical and advantageous forms of realization of a cincture structure of the kind particularly resistant to tension stresses and put under tension by the inflation pressure, in the case where the cords must be disposed in a prevailingly longitudinal direction, namely, parallel to the plane of symmetry of the tire normal to the axis of rotation.

When the cincture structure is composed of a single layer, the fabric, that is, the assemblage made of textile or metallic cords disposed parallel to one another and rubberized, previously cut into a desired width "L," could be wrapped until its ends are approached. This structure obviously shows a solution of continuity which renders it unable to withstand tension stresses.

In order to obtain a cincture structure capable of withstanding the tension stresses, the fabric should be on the contrary wrapped in such a way that one of its ends overlaps the other for a certain length. This length should be such that, after having been reduced owing to the expansion movements caused by the moulding and vulcanizing operations, there will still be remaining in overlap a length "S" sufficient to insure by means of the adhesion of the rubber wherein the cords had previously been embedded, the resistance to the tension stresses to which the structure will be subjected during employment of the tire.

However, on account of the different thickness in the overlapped portion, the cincture structure gives rise to some inconveniences, particularly in relation to the comfort in running conditions, and is, moreover, the cause of a dynamic unbalance which greatly increases, the higher the speed of the vehicle.

An object of the present invention is to provide a cincture structure that consists of elementary rings independent of one another, placed side by side to reach a desired width "L," and each of which is made of a single rubberized cord or of a tape having reduced width made of rubberized fabric consisting of few cords, the ends of said elementary ring being approached but not overlapped. The interruptions of each elementary ring—indicated with the reference numerals 1, 2 and 3 in Fig. 1—are suitably offset in relation to one another so that none of the generating lines of the cylindrical surface forming the ring-shaped structure shows more than one interruption.

In the drawings, Figure 1 shows, in perspective, the offset relation of the interruptions referred to above in a single cylindrical plane;

In a preferred form of embodiment of the invention, the interruptions will be uniformly disposed along the whole periphery which is obtained by distributing them progressively offset of a length "m" equal to $$\frac{2\pi R}{n}$$

where $n$ is the number of elementary rings and "R" their radius.

The described ring-shaped structure, while capable of withstanding tension stresses, also has the advantage of following better the expansions occurring during the moulding and vulcanizing steps.

Another construction is obtained by fabric of width "L" spirally wrapped about the carcass. The fabric is interrupted in sections having such a length that each layer does not contain a whole number of sections and that the interruptions in the different layers are always offset from one another.

In such a way, the manufacture of the ring-shaped structure is considerably simplified in that it is sufficient for the fabric sections previously cut into a desired width "L" and having a suitably determined length to be disposed onto the carcass the one after the other so as to obtain the desired number of layers by means of an interrupted spiral.

In a preferred form of realization the interruptions will be uniformly distributed along the whole periphery, which is practically obtained by cutting the sections in a predetermined constant length.

Figure 1:
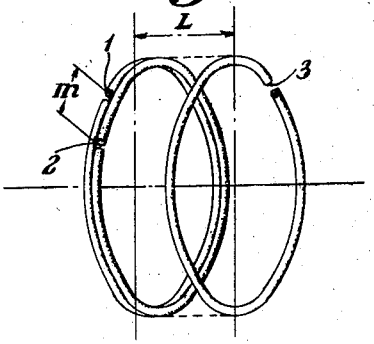
Figure 2:
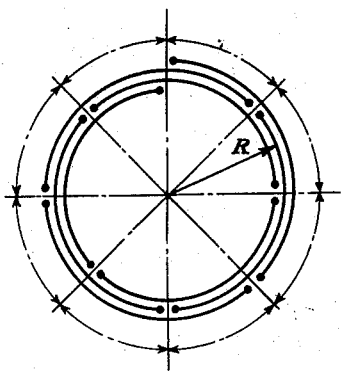
Figure 2 is a diagrammatical side view of a modification showing the offset relation of the interruptions in a plurality of spirally wrapped layers.

Fig. 2 illustrates diagrammatically by way of example a side view of a ring-shaped structure composed of three layers built up with eight sections, the single length of them being $$\frac{2\pi R \times 3}{8} = \frac{3}{4}\pi R$$

where R is the radius of the mean coil.

Another construction to be claimed is the one composed of "S" number of superposed layers of fabric, having a desired width "L," each of which is built up with an "n" number of sections, hereinafter called sectors, forming in each layer "n" interruptions and so disposed that the interruptions of different layers are never superposed.

For purposes of symmetry and convenience it will be advisable, in accordance with a preferred form of embodiment of the invention, that in the various superposed layers the interruptions be offset for an angle the value of which is $$K = \frac{360°}{nS}$$

Figure 3:
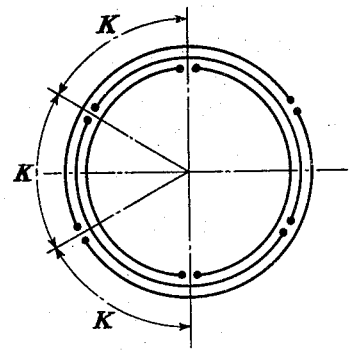
Figure 3 is a diagrammatical side view of a modification showing the offset relation of the interruptions in a plurality of layers wrapped in parallel fashion.

Fig. 3 illustrates by way of example the case of $S=3$ layers each formed of $n=2$ sectors.

Figure 4:
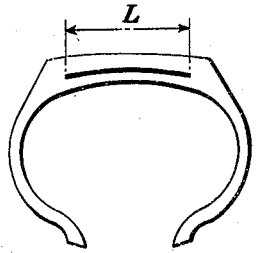
Figure 4 is a diagrammatical cross-section view through a tire, showing the employment of the invention in terms of a single ring which is continuous in the transverse direction.
Figure 5:
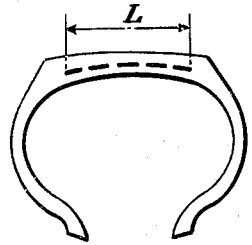
Figure 5 is a view similar to Figure 4 where the invention is shown in terms of a plurality of independent rings parallel to one another in the transverse direction.

The cinture structure may be carried out instead of by means of a ring continuous in transversal extension, as diagrammatically indicated in Fig. 4, with several independent rings parallel and distanced from one another, as diagrammatically indicated in Fig. 5, placed in a zone below the tread and having a total width "L," each of said rings being composed of one or more layers and built up in accordance with any of the precedingly shown constructions, constituting therefore various forms of embodiment of the invention.

The above specified realizations are only given by way of example and are not limitative; it is understood that the present invention includes any other form of realization carried out in accordance with the inventive principles herein described.

For the aims of the present invention it is also understood that natural and/or synthetic rubber compounds or plastic materials may be employed for rubberizing the single cords, the fabric tapes and the fabric strips.

It is finally specified that the expression "cords" connotes filiform elements made of single threads or of a plurality of threads, which are stranded in manners already known in the tire industry.

What is claimed is:

1. For use in connection with a pneumatic tire for vehicle wheels of any kind, the improvement which comprises a ring-shaped cincture structure capable of withstanding tension stresses when put under tension by the inner inflation pressure of said tire, said structure being composed of a substantially inextensible strip having a plurality of circumferential coils and characterized by at least one interruption for each 360° of said coils with the terminating portions located adjacent each other but not superposed, the interruptions being circumferentially staggered.

2. A cincture structure as set forth in claim 1 wherein said plurality of coils are constituted by a plurality of elementary independent rings of equal diameter, closely spaced to one another to form a layer of the required width, each said elementary ring being formed of a single elongated member previously rubberized, each said ring having one of said interruptions at its ends; said interruptions being offset in the various rings with respect to one another in such a way that the generating lines of the cylindrical surface formed by said rings intersect less than two such interruptions.

3. A cincture structure as set forth in claim 2 characterized in that said interruptions are uniformly distributed along the whole periphery of the cylindrical surface formed by said rings.

4. A ring-shaped structure as set forth in claim 2 wherein each single elongated member is formed of a single cord.

5. A ring-shaped structure as set forth in claim 2 wherein each single elongated member is formed of a tape of rubberized fabric containing a few cords.

6. A ring-shaped cincture band for pneumatic tires comprising a plurality of spirally wrapped, superposed, layers of rubberized fabric, each layer comprising circumferentially extending, parallel cords, the ring-shaped cincture band being divided into a plurality of longitudinally extending sections of pretermined constant width, the ends of adjacent sections being contiguous but not overlapping, the sections being of such length that the interruptions in each layer are offset in relation to the interruptions in the other layers.

7. A ring-shaped structure as in claim 6 characterized in that the sections of the fabric have a constant length, so determined that the interruptions between the various sections are practically uniformly distributed along the periphery of the structure itself.

8. In a ring-shaped structure for pneumatic tires provided with a carcass and with a cincture structure of the kind suitable to withstand tension stresses and put under tension by the inner inflation pressure, wherein said cincture structure comprises at least two layers of rubberized fabric having cords parallel to one another and disposed in circumferential direction, the improvement wherein said cincture structure is formed of single layers of fabric of the required width, circumferentially wrapped on the carcass, each layer being composed of several sections the ends of which are approached but not overlapped so as to provide resulting interruptions, the disposition of said sections being such that the interruptions in the different layers are offset with respect to one another so as to be never superposed in different layers.

9. A ring-shaped structure as in claim 8 wherein the interruptions between the sections, in the different layers, are offset from one another for a constant interval.

10. A ring-shaped structure as in claim 8 characterized in that it is subdivided in its transversal direction into several rings, parallel and distanced from one another, each ring being made as in claim 8.

11. A pneumatic tire for vehicle wheels of any kind characterized by comprising a ring-shaped structure as claimed in claim 8.

12. The combination comprising a tire carcass and a cincture band wrapped thereon, said cincture band being composed of a substantially inextensible strip member having a plurality of coils and characterized by at least one interruption for each 360° of said coils, the interruptions being circumferentially staggered.

References Cited in the file of this patent

UNITED STATES PATENTS

| 1,188,062 | Gammeter | June 20, 1916 |
| 2,059,764 | Zerillo | Nov. 3, 1936 |

FOREIGN PATENTS

| 382,823 | France | Feb. 17, 1908 |
| 410,031 | France | Mar. 5, 1910 |
| 508,165 | Belgium | Jan. 15, 1952 |
| 720,150 | Great Britain | Dec. 15, 1954 |